United States Patent
Xiong et al.

(10) Patent No.: US 10,217,481 B1
(45) Date of Patent: Feb. 26, 2019

(54) DATA STORAGE DEVICE EMPLOYING LOW DUTY CYCLE SQUARE WAVE TO DETECT HEAD TOUCHDOWN

(71) Applicant: Western Digital Technologies, Inc., San Jose, CA (US)

(72) Inventors: Shaomin Xiong, Fremont, CA (US); Na Wang, San Jose, CA (US); Robert Smith, San Jose, CA (US); Sripathi V. Canchi, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/924,555

(22) Filed: Mar. 19, 2018

(51) Int. Cl.
*G11B 5/60* (2006.01)

(52) U.S. Cl.
CPC ......... *G11B 5/6017* (2013.01); *G11B 5/6076* (2013.01); *G11B 5/607* (2013.01); *G11B 5/6023* (2013.01); *G11B 5/6058* (2013.01)

(58) Field of Classification Search
None
See application file for complete search history.

(56) References Cited

U.S. PATENT DOCUMENTS

| | | | | |
|---|---|---|---|---|
| 6,452,735 B1* | 9/2002 | Egan | ...................... | G11B 21/21 360/25 |
| 7,199,960 B1* | 4/2007 | Schreck | ............... | G11B 5/6017 360/25 |
| 7,729,079 B1* | 6/2010 | Huber | .................. | G11B 5/6064 360/75 |
| 8,059,357 B1* | 11/2011 | Knigge | ................. | G11B 5/6011 360/75 |
| 8,681,445 B1 | 3/2014 | Kermiche et al. | | |
| 8,699,173 B1* | 4/2014 | Kang | .................. | G11B 5/6076 360/75 |
| 8,891,341 B1* | 11/2014 | Krichevsky | .............. | G11B 5/02 369/13.13 |
| 8,970,978 B1 | 3/2015 | Knigge et al. | | |
| 9,595,280 B2 | 3/2017 | Canchi et al. | | |
| 9,786,309 B1* | 10/2017 | Knigge | ................. | G11B 5/6076 |
| 2010/0259850 A1 | 10/2010 | Miyake et al. | | |
| 2012/0218659 A1 | 8/2012 | Liu et al. | | |

* cited by examiner

Primary Examiner — Tan X Dinh

(57) ABSTRACT

A data storage device is disclosed comprising a head actuated over a disk, wherein the head comprises a fly height actuator (FHA). An FHA control signal is applied to the FHA, wherein the FHA control signal comprises a rectangular wave having a duty cycle in the range of ten percent to thirty percent. While applying the FHA control signal to the FHA, the head touching down onto the disk is detected.

20 Claims, 5 Drawing Sheets

DATA STORAGE DEVICE EMPLOYING LOW DUTY CYCLE SQUARE WAVE TO DETECT HEAD TOUCHDOWN

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to the disk by modulating a write current in an inductive coil to record magnetic transitions onto the disk surface in a process referred to as saturation recording. During read-back, the magnetic transitions are sensed by a read element (e.g., a magneto-resistive element) and the resulting read signal demodulated by a suitable read channel. A recent development referred generally as energy assisted magnetic recording (EMR) enhances the writing process by augmenting the magnetic field generated by the write coil with an additional energy source. For example, with heat assisted magnetic recording (HAMR) the quality of written data is improved by heating the disk surface during write operations in order to decrease the coercivity of the magnetic medium, thereby enabling the magnetic field generated by the write coil to more readily magnetize the disk surface. In another example, with microwave assisted magnetic recording (MAMR) the quality of written data is improved by using a spin torque oscillator (STO) to apply a high frequency auxiliary magnetic field to the media close to the resonant frequency of the magnetic grains.

DETAILED DESCRIPTION

Figure 1:
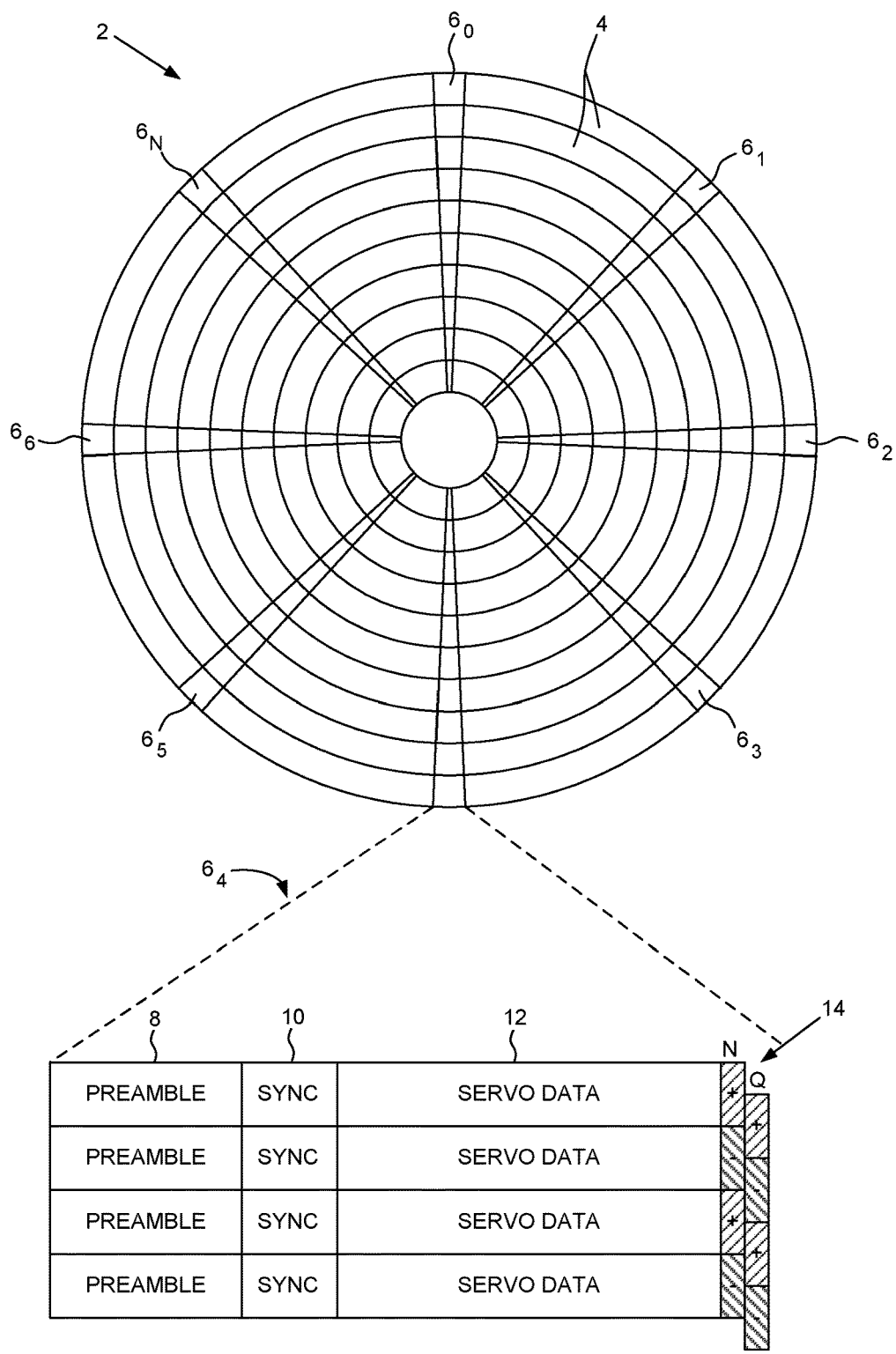
FIG. 1 shows a prior art disk format comprising a plurality of servo tracks defined by servo sectors.
Figure 2A:
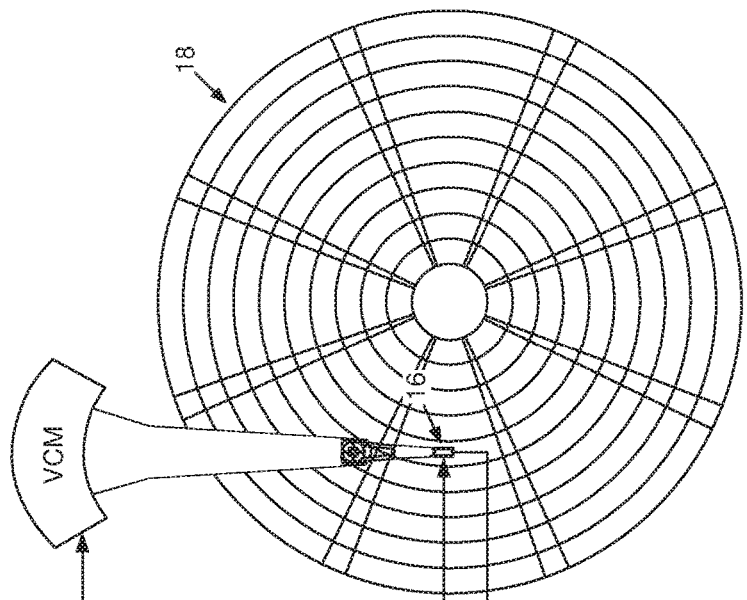
FIG. 2A shows a data storage device in the form of a disk drive according to an embodiment comprising a head actuated over a disk, wherein the head comprises a fly height actuator (FHA).
Figure 2B:
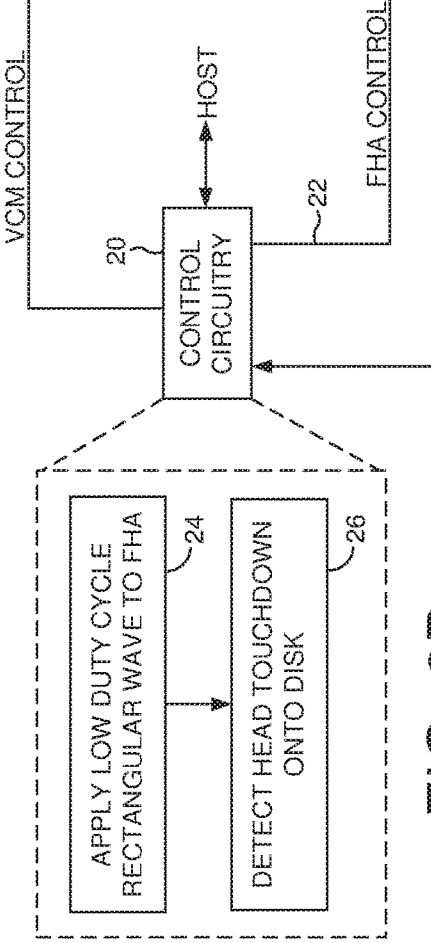
FIG. 2B is a flow diagram according to an embodiment wherein a low duty cycle rectangular wave is applied to the FHA in order to detect a touchdown of the head onto the disk.

FIG. 2A shows a data storage device in the form of a disk drive according to an embodiment comprising a head 16 actuated over a disk 18, wherein the head comprises a fly height actuator (FHA). The disk drive further comprises control circuitry 20 configured to execute the flow diagram of FIG. 2B, wherein a FHA control signal 22 is applied to the FHA, wherein the FHA control signal comprises a rectangular wave having a duty cycle in the range of ten percent to thirty percent (block 24). While applying the FHA control signal to the FHA, the head touching down onto the disk is detected (block 26).

Any suitable FHA may be integrated into the head 16, such as a piezoelectric actuator which controls the fly height electromechanically, or a suitable heating element which controls the fly height through thermal expansion. The control circuitry 20 generates a suitable FHA control signal 22 (e.g., a current or voltage) which is applied to the FHA in order to adjust the fly height of the head over the disk. In one embodiment, the fly height of the head affects the ability to successfully recover the recorded data during a read operation. Accordingly, in one embodiment the FHA control signal 22 is calibrated in order to achieve a target fly height, such as by calibrating the FHA control signal 22 (DC level) that causes the head to touchdown onto the disk surface, and then backing off the FHA control signal 22 by a predetermined offset to achieve the target fly height.

Figure 2C:
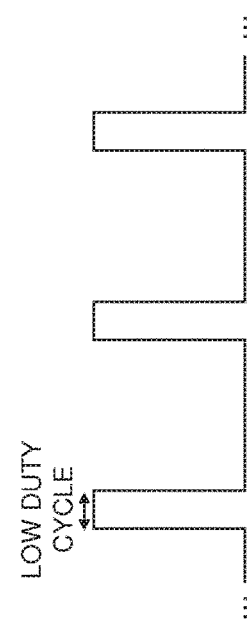
FIG. 2C shows an example rectangular wave having a duty cycle in the range of ten percent to thirty percent.

FIG. 2C shows an example rectangular wave according to an embodiment having a low duty cycle. In one embodiment, generating the FHA control signal as a low duty cycle rectangular wave helps minimize the time the head (or head component) contacts the disk surface when detecting the touchdown event. For example, in HAMR disk drives the head 16 may comprise a near field transducer (NFT) which protrudes toward the disk surface when the FHA control signal is applied to the FHA. Minimizing the contact time the NFT contacts the disk surface helps maximize the longevity of the NFT. Similarly, in MAMR disk drives minimizing the head contact time helps maximize the longevity of the STO.

Figure 3A:
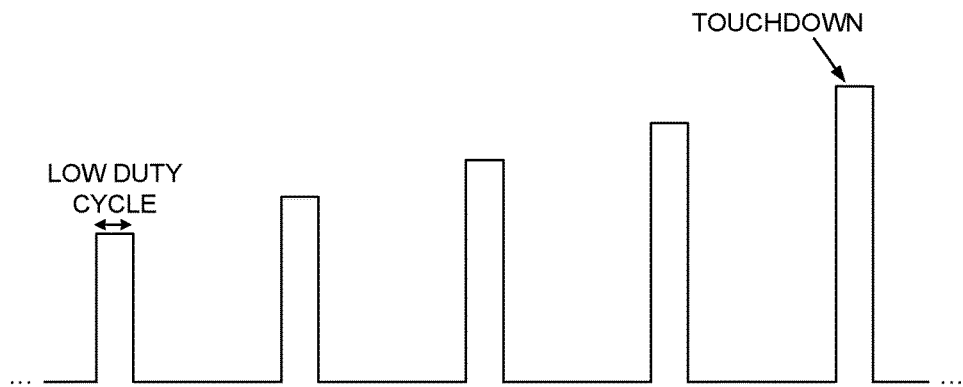
FIG. 3A shows an embodiment wherein an amplitude of the rectangular wave is increased until the touchdown is detected.

FIG. 3A shows an embodiment wherein when calibrating the FHA control signal that causes touchdown, an amplitude of the rectangular wave is initialized to a low value and then increased incrementally until touchdown is detected. Any suitable technique may be employed to detect the touchdown event, such as by employing a suitable acoustic emission sensor. In another embodiment, the head 16 may comprise a suitable touchdown sensor, and in another embodiment, the touchdown may be detected based on the read signal generated by the read element of the head 16. In yet other embodiments, touchdown may be detected by detecting timing variations in the rotation speed of the disk, for example, by detecting a timing variation in the back electromotive force (BEMF) voltage of the spindle motor or by detecting timing variations between consecutive servo wedges. In one embodiment, when touchdown is detected the operating amplitude of the FHA control signal (DC level) may be selected relative to the average amplitude of the rectangular wave (e.g., half the pulse amplitude) that caused the touchdown.

Figure 3B:
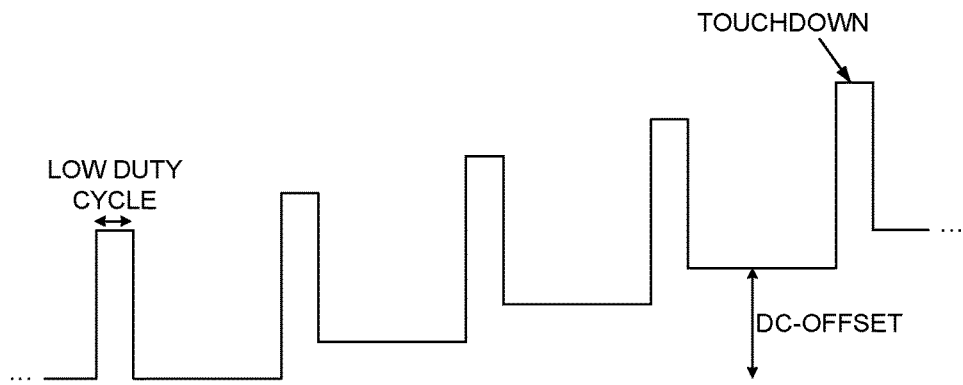
FIG. 3B shows an embodiment wherein a DC offset of the rectangular wave is increased until the touchdown is detected.

FIG. 3B shows an alternative embodiment wherein a DC offset of the rectangular wave is increased until the touchdown is detected. The DC offset is initialized to a starting value (e.g., zero), and then incrementally increased such as shown in FIG. 3B. When touchdown is detected, the operating amplitude of the FHA control signal (DC level) may be selected relative to the DC offset of the rectangular wave as well as the pulse amplitude that caused the touchdown (e.g., half the pulse amplitude). In one embodiment, the DC offset of the rectangular wave may be incremented by a suitable value which balances the time required to execute the touchdown procedure with the desire to minimize the contact force when touchdown occurs.

Figure 4:
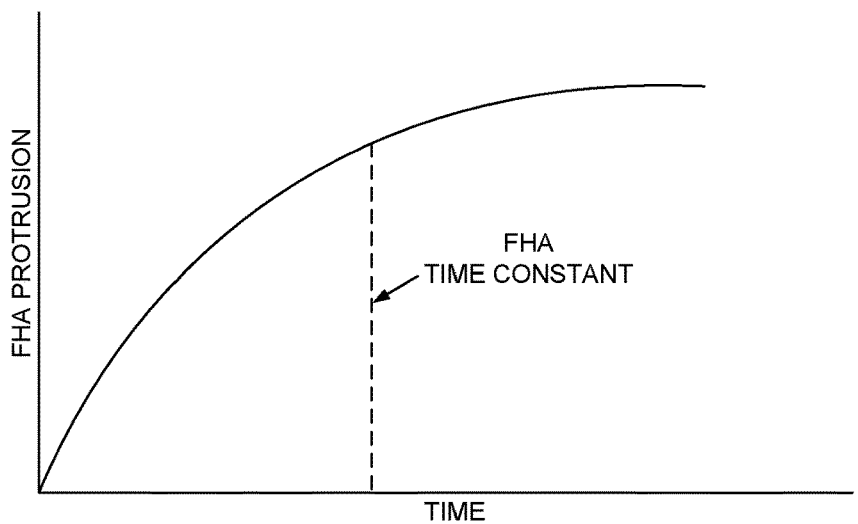
FIG. 4 shows an embodiment wherein a pulse width of the rectangular wave is approximately three times a time constant of the FHA.

FIG. 4 shows an embodiment where a time constant is associated with the FHA, which is the time needed for the FHA to protrude by approximately sixty-three percent when actuated by a step input. In one embodiment, the duty cycle of the rectangular wave is configured based on the FHA time constant, such as by configuring a pulse width of the rectangular wave to be approximately three times the FHA time constant. This embodiment may ensure the FHA protrudes by a minimal amount to detect the touchdown, thereby minimizing the time the head contacts the disk surface during the touchdown event. Any suitable technique may be employed to measure the FHA time constant, such as by measuring a nominal time constant for a subset of FHAs and configuring each production disk drive with the nominal time constant (or a nominal rectangular wave pulse width). In one embodiment, the FHA time constant may be affected by environmental conditions, such as ambient temperature. Accordingly in one embodiment, the rectangular wave pulse width (duty cycle) may be configured relative to detected environmental conditions when executing the touchdown procedure.

Figure 5A:
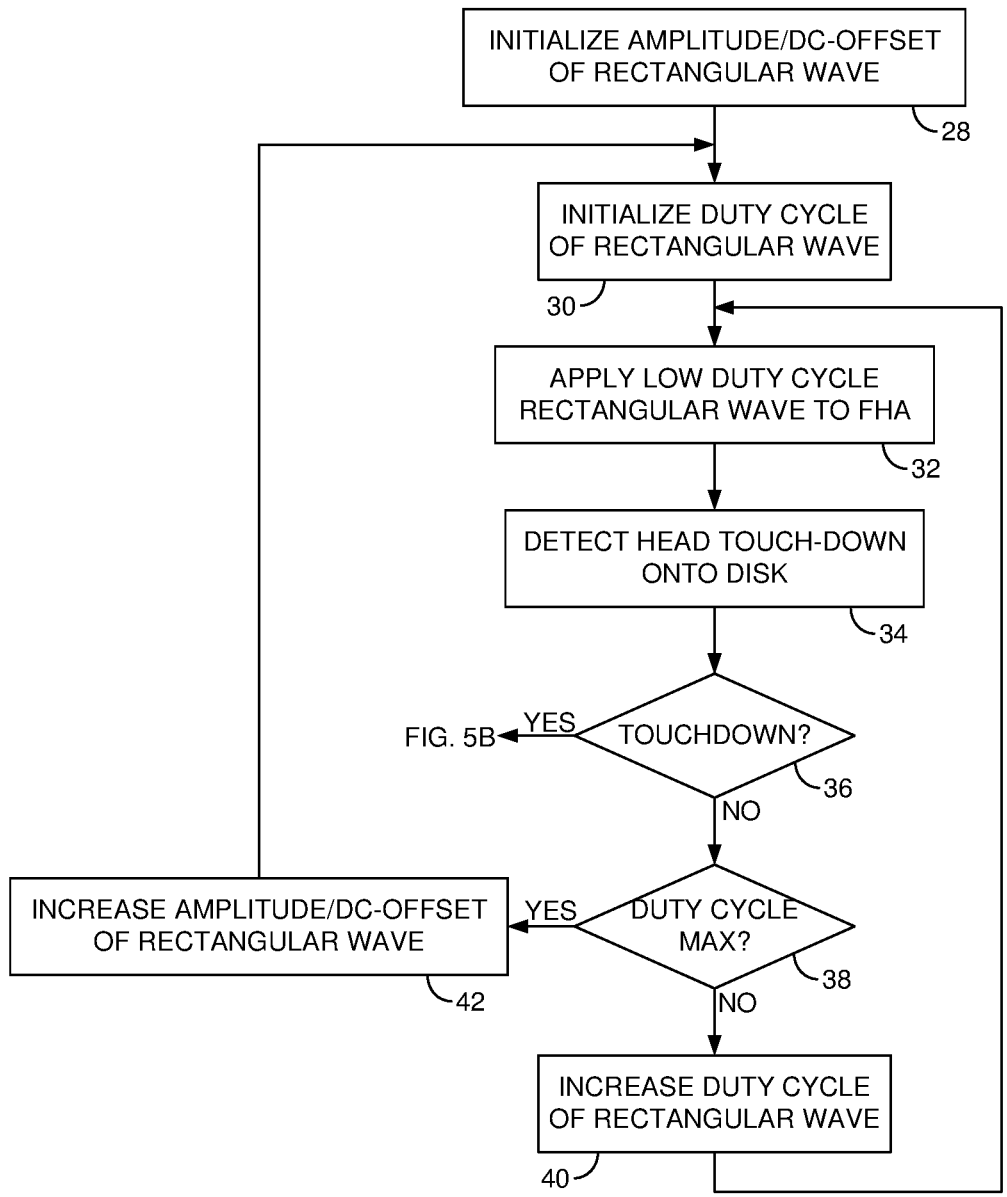
FIG. 5A is a flow diagram according to an embodiment wherein a duty cycle of the rectangular wave is adjusted until the touchdown is detected.

FIG. 5A is a flow diagram according to an embodiment wherein the duty cycle of the FHA rectangular wave may be calibrated, for example, during a manufacturing procedure of the disk drive or while the disk drive is deployed in the field. An amplitude or DC offset of the rectangular wave (FIG. 3A or FIG. 3B) is initialized to a starting value that ensures the head will not contact the disk (block 28), and the duty cycle is initialized to a suitable minimum value (such as ten percent) that ensures the touchdown will not be detected at that value (block 30). The rectangular wave is applied to the FHA (block 32), and a suitable touchdown detection algorithm executed to determine whether the head has contacted the disk (block 34). If the touchdown is not detected (block 36), and the duty cycle of the rectangular wave has not reached a maximum (block 38), the duty cycle of the rectangular wave is increased (block 40) and the flow diagram repeated starting at block 32. If the duty cycle of the rectangular wave reaches a maximum value at block 38, the amplitude or DC offset of the rectangular wave is increased (block 42), and the flow diagram is repeated starting from block 30.

Figure 5B:
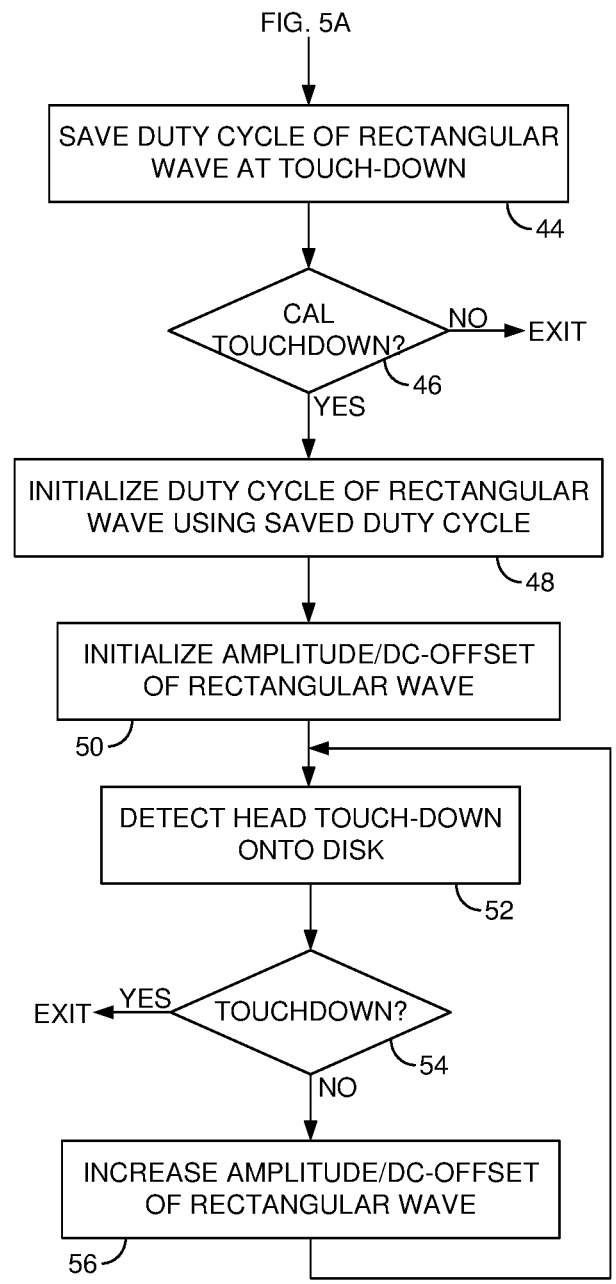
FIG. 5B is a flow diagram according to an embodiment wherein the duty cycle that causes touchdown is saved and used to periodically execute a touchdown procedure to detect the touchdown.

When the touchdown is detected at block 36 of FIG. 5A, the flow diagram of FIG. 5B may be executed wherein the duty cycle of the rectangular wave that caused the touchdown is saved (block 44). Over the life of the disk drive, the touchdown procedure may be re-executed, for example, at a predetermined interval, when environmental conditions change, when the data recovery performance degrades, etc., in order to recalibrate the FHA control signal that achieves a target fly height. When the touchdown procedure is executed (block 46), the duty cycle of the FHA rectangular wave is initialized using the duty cycle saved at block 44, for example, by subtracting a predetermined offset from the saved duty cycle (block 50). The amplitude or DC offset of the FHA rectangular wave is initialized to a suitable value that ensures the head will not contact the disk (block 50), and the touchdown detection algorithm is executed (block 52). If the touchdown is not detected (block 54), the amplitude or DC offset of the rectangular wave is increased (block 56) and the flow diagram repeated starting from block 52 until the touchdown is detected at block 54. In this embodiment, initializing the duty cycle of the FHA rectangular wave using the saved touchdown value at block 48 decreases the execution time of the touchdown procedure.

In one embodiment, the flow diagram of FIG. 5B may be modified to adjust the duty cycle of the FHA rectangular wave similar to the flow diagram of FIG. 5A. For example, if the amplitude or DC offset of the rectangular wave reaches a predetermined threshold at which touchdown should have been detected at block 52, the amplitude or DC offset of the rectangular wave may be reset to a lower value and the duty cycle increased. The amplitude or DC offset of the rectangular wave may then be adjusted through the predetermined range and the process repeated until touchdown is detected. If the duty cycle is adjusted during the touchdown procedure, the saved duty cycle may be updated and used to initialize the duty cycle at block 48 when the touchdown procedure is executed again.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:
1. A data storage device comprising:
a disk;
a head actuated over the disk, wherein the head comprises a fly height actuator (FHA); and
control circuitry configured to:
apply a FHA control signal to the FHA, wherein the FHA control signal comprises a rectangular wave having a duty cycle in the range of ten percent to thirty percent; and
while applying the FHA control signal to the FHA, detect the head touching down onto the disk.
2. The data storage device as recited in claim 1, wherein the control circuitry is further configured to increase an amplitude of the rectangular wave until the touchdown is detected.
3. The data storage device as recited in claim 1, wherein the control circuitry is further configured to increase a DC offset of the rectangular wave until the touchdown is detected.
4. The data storage device as recited in claim 1, wherein the duty cycle of the FHA control signal is based on a time constant of the FHA.
5. The data storage device as recited in claim 4, wherein a pulse width of the rectangular wave is approximately three times a time constant of the FHA.
6. The data storage device as recited in claim 1, wherein the control circuitry is further configured to adjust the duty cycle of the rectangular wave until the touchdown is detected.
7. The data storage device as recited in claim 1, wherein the control circuitry is further configured to:
a) initialize an amplitude of the rectangular wave;
b) initialize the duty cycle of the rectangular wave;
c) when the touchdown is not detected at a current duty cycle and a current amplitude, increase the duty cycle;
d) when the duty cycle reaches a maximum value without detecting the touchdown, reset the duty cycle to the minimum value and increase the amplitude; and
e) repeat (c) through (d) until the touchdown is detected.
8. The data storage device as recited in claim 7, wherein the control circuitry is further configured to:
save the duty cycle setting of the FHA control signal when the touchdown is detected; and
use the saved duty cycle setting to periodically execute a touchdown procedure to detect the touchdown.
9. The data storage device as recited in claim 1, wherein the control circuitry is further configured to:
a) initialize a DC offset of the rectangular wave;
b) initialize the duty cycle of the rectangular wave;
c) when the touchdown is not detected at the current duty cycle and the current DC offset, increase the duty cycle;
d) when the duty cycle reaches a maximum value without detecting the touchdown, reset the duty cycle to the minimum value and increase the DC offset; and
e) repeat (c) through (d) until the touchdown is detected.
10. The data storage device as recited in claim 9, wherein the control circuitry is further configured to:
save the duty cycle setting of the FHA control signal when the touchdown is detected; and
use the saved duty cycle setting to periodically execute a touchdown procedure to detect the touchdown.
11. A method of operating a data storage device, the method comprising:
actuating a head over a disk, wherein the head comprises a fly height actuator (FHA);
applying a FHA control signal to the FHA, wherein the FHA control signal comprises a rectangular wave having a duty cycle in the range of ten percent to thirty percent; and
while applying the FHA control signal to the FHA, detecting the head touching down onto the disk.
12. The method as recited in claim 11, further comprising increasing an amplitude of the rectangular wave until the touchdown is detected.
13. The method as recited in claim 11, further comprising increasing a DC offset of the rectangular wave until the touchdown is detected.
14. The method as recited in claim 11, wherein the duty cycle of the FHA control signal is based on a time constant of the FHA.

15. The method as recited in claim 14, wherein a pulse width of the rectangular wave is approximately three times a time constant of the FHA.

16. The method as recited in claim 11, further comprising adjusting the duty cycle of the rectangular wave until the touchdown is detected.

17. The method as recited in claim 11, further comprising:
a) initializing an amplitude of the rectangular wave;
b) initializing the duty cycle of the rectangular wave;
c) when the touchdown is not detected at a current duty cycle and a current amplitude, increasing the duty cycle;
d) when the duty cycle reaches a maximum value without detecting the touchdown, resetting the duty cycle to the minimum value and increase the amplitude; and
e) repeating (c) through (d) until the touchdown is detected.

18. The method as recited in claim 17, further comprising:
saving the duty cycle setting of the FHA control signal when the touchdown is detected; and
using the saved duty cycle setting to periodically execute a touchdown procedure to detect the touchdown.

19. The method as recited in claim 11, further comprising:
a) initializing a DC offset of the rectangular wave;
b) initializing the duty cycle of the rectangular wave;
c) when the touchdown is not detected at the current duty cycle and the current DC offset, increasing the duty cycle;
d) when the duty cycle reaches a maximum value without detecting the touchdown, resetting the duty cycle to the minimum value and increase the DC offset; and
e) repeating (c) through (d) until the touchdown is detected.

20. The method as recited in claim 19, further comprising:
saving the duty cycle setting of the FHA control signal when the touchdown is detected; and
using the saved duty cycle setting to periodically execute a touchdown procedure to detect the touchdown.

\* \* \* \* \*